J. H. RICHARDS.
ENGINE STARTER.
APPLICATION FILED DEC. 2, 1919.
1,379,214.
Patented May 24, 1921.
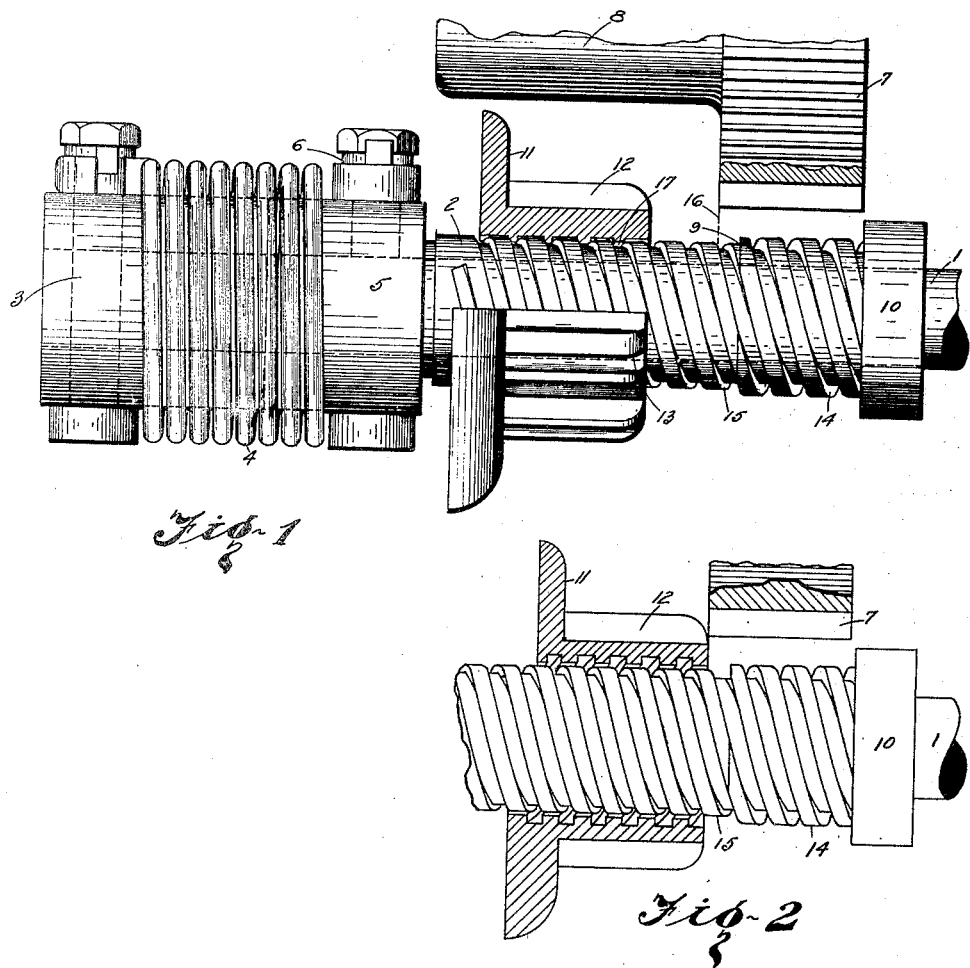
INVENTOR
Julius H. Richards
BY
Albion D. T. Libby
ATTORNEY

UNITED STATES PATENT OFFICE.

JULIUS H. RICHARDS, OF SPRINGFIELD, MASSACHUSETTS, ASSIGNOR TO ECLIPSE MACHINE COMPANY, OF ELMIRA HEIGHTS, NEW YORK, A CORPORATION OF NEW YORK.

ENGINE-STARTER.

1,379,214. Specification of Letters Patent. Patented May 24, 1921.

Application filed December 2, 1919. Serial No. 342,023.

*To all whom it may concern:*

Be it known that I, JULIUS H. RICHARDS, a citizen of the United States, residing at Springfield, in the county of Hampden, State of Massachusetts, have invented certain new and useful Improvements in Engine-Starters, of which the following is a description, reference being had to the accompanying drawing and to the figures of reference marked thereon.

My invention relates to means for starting engines particularly of the internal combustion type wherein the engine member is provided with gear teeth which are adapted to be engaged by a driving member usually operated by an electric motor. My invention is especially adapted for use in connection with a starter known in the trade as the "Bendix drive" yet it will be apparent to one skilled in the art that the invention may be applied to other types of drives, such as the Bijur or to a drive of the kind shown in my Patent #1,310,091, issued July 15, 1919.

By way of illustration, I have shown the application of my invention to a type of drive as illustrated in Bendix Patent #1,250,269, issued December 18, 1917. In drives of this type or in other types wherein the engagement of the engine member is made automatically by means of screw threads on the driving shaft and a driving member operated by said screw threads, it frequently happens that the gear in its longitudinal movement along the operating shaft strikes on the edge of the gear teeth on the engine member in such a manner that parts or whole gear teeth on the engaging member will be broken off even though the engaging gear be beveled off same as indicated in the Bendix patent above referred to.

It is the principal object of my invention to entirely eliminate all breakage of teeth on the engine member as well as on the engaging gear itself, although this latter rarely happens.

My invention will best be understood by reference to the annexed drawings, wherein—

Figure 1 is an elevation of a starter drive embodying my invention with part of the engaging gear cut away to show a certain detail, and Fig. 2 is a partial view similar to Fig. 1 showing the engaging gear or driving member at the time when it meets an obstruction, such as the end of a gear tooth on the engine member.

Since the Bendix drive is well understood, it will not be particularly described herein and the description will be limited to the improvement incorporated in such a design. 1 illustrates a driving shaft which is connected to a threaded sleeve 2 by means of a bolt 3, spring 4, collar 5 and bolt 6, all in a well known manner. 7 illustrates gear teeth on an engine member, such as flywheel 8. The sleeve 2 has a portion of its threads beginning at the point 9 and extending outwardly toward the collar 5, reduced in diameter. This reduced portion of the threads, I term the engagement portion of the screw threads. From the point 9 inwardly toward the collar 10 which acts as a stop for the driving gear the teeth are of normal working size which, I term cranking threads. Mounted on the screw threads but normally in inoperative position out of engagement with the gear teeth 7 is a driving device 11. In the form shown the driving device 11 consists of a gear having teeth 12 on one portion thereof, the outer ends of said teeth being beveled off at 13 to assist in engagement with the gear teeth 7. Another portion of the gear has screw threads thereon to engage the screw threads on the sleeve 2.

The bore or inside diameter of the pinion is made larger than the outside diameter of the engagement screw threads and thereby the same fits loosely thereon with the result that in case such pinion in its longitudinal travel abuts the flywheel, it will stop and the screw shaft will rotate freely therein. However, the bore of such pinion is of a proper relative diameter as to effect driving when in coöperation with the cranking threads.

In the operation of my invention the driving device is normally resting on the engagement screw threads. When power is applied to the driving shaft 1, as by the operation of an electric starting motor, the driving device 11 moves longitudinally of the shaft 1 and if no obstruction is met by the teeth 12 they will pass into engagement with the teeth 7 and the screw threaded portion of the driving device 11 will pass into engagement with the cranking screw threads 14. However, should the teeth 12 meet with an obstruction, such as the teeth 7, the driving device 11 which it will be understood will have an exceedingly loose fit on the engagement screw threads 15 but which, however, is sufficient to cause the driving device 11 to advance longitudinally, will be stopped in its longitudinal movement and will be lifted up to the position shown in Fig. 2, whereupon the shaft will continue to rotate but without any effect upon the driving device or pinion. The construction and relation of the engagement threads 15 with reference to the corresponding threads in the driving device 11 is such that very little effort is required to make the driving device 11 operate in the manner above described. By leaving the cranking threads 14 at their normal size I get greater strength in the threads for the cranking effort. I preferably position the beginning 9 of the engagement threads 15 at a point within the line of engagement 16 of the gear teeth 7. Furthermore in order to facilitate the engagement of the threads in the driving device 11 with the cranking threads 14, I may, in some cases, cut out a part of the depth of the threads in the member 11 as indicated at 17, Fig. 1, whereby a greater clearance is left for a short distance longitudinally of the member 11 allowing the threads 14 to easily engage the threaded portion of member 11.

It will be apparent to one skilled in the art that the screw threads 15 and 14 may be cut directly on the shaft 1, or as has been stated the invention may be applied to a drive of the Bijur type or to the type shown in my patent previously referred to and while I have shown one embodiment of my invention, it will be apparent that the details for carrying the same into practice may be varied over a considerable range without departing from the spirit of my invention and the scope of the appended claims.

Having thus described my invention, what I claim is:—

1. In an engine starter, a drive including a rotatable shaft, a driving member mounted thereon for longitudinal movement thereon and rotary movement therewith, said shaft having two separate means arranged in alinement and coöperating with the driving member, the first means being arranged to advance the driving member longitudinally to the zone of the second means and also permit the shaft to rotate freely within the driving member and without effect thereon when such member in its longitudinal movement encounters an obstruction, and the second means being arranged to positively engage such member to advance it into driving position and cause rotation thereof.

2. In an engine starter, a drive including a rotatable shaft and a driving member mounted thereon for longitudinal movement thereon and rotary movement therewith, said shaft having screw threads on one portion of which the driving member fits loosely to permit longitudinal movement when the shaft is rotated and to permit the shaft to freely rotate within such member when the latter is stopped in its longitudinal movement.

3. In an engine starter, a drive including a rotatable shaft and a driving member mounted thereon for longitudinal movement thereon and rotary movement therewith, said shaft having in alinement two sections of screw threads of different diameters, the driving member being formed to fit loosely on the threads of the lesser diameter and to fit drivingly on the other threads.

4. In an engine starter, a drive including a rotatable shaft having screw threads thereon, a pinion mounted on such threads so as to have longitudinal movement on the shaft and rotary movement therewith, said threads being of two different diameters and the pinion fitting loosely on the threads of the lesser diameter to permit the shaft to rotate freely within the pinion when the latter becomes stopped in its longitudinal travel.

5. In an engine starter, a drive including a rotatable shaft having screw threads thereon, a pinion mounted on such threads so as to have longitudinal movement on the shaft and rotary movement therewith, said threads being reduced in diameter in that section of the shaft occupied by the pinion in its normal position and in its longitudinal movement prior to its engagement with a member of the engine to be started.

6. In an engine starter, a drive including a rotatable screw shaft having two sets of threads in alinement and of different diameters, the set of the lesser diameter being used for engagement purposes and the other set for cranking purposes, and a pinion having a screw threaded bore fitting upon the latter set of threads for screw action only and fitting loosely upon the first set for screw action on the shaft and for permitting such shaft to rotate within the pinion while stationary.

7. In an engine starter, a drive including a rotatable screw shaft having two sets of threads in alinement and of different diameters, the set of the lesser diameter being used for engagement purposes and the other set for cranking purposes, and a pinion having a screw threaded bore fitting upon the latter set of threads for screw action only and fitting loosely upon the first set for screw action on the shaft and for permitting such shaft to rotate within the pinion while stationary, the forward end of the bore of the pinion being counterbored to facilitate engagement of such pinion with the cranking threads.

8. In an engine starter, the combination of an operating shaft, having screw threads rigid therewith, a member for driving the engine member mounted on said shaft and adapted to travel longitudinally thereon, said screw threads on said shaft and member carried thereon being so constructed for coöperation that should said member be stopped in its longitudinal travel, the shaft will continue to rotate but without effect upon said member.

9. In an engine starter the combination of an operating shaft having screw threads thereon rigid therewith, driving means carried on said shaft and coöperating with said threaded portion so as to have longitudinal movement on the shaft and rotary motion therewith, said coöperating threaded portion being so constructed that when said driving means is stopped in its longitudinal movement along the shaft such shaft may continue to rotate but without effect upon said driving means.

In testimony whereof, I affix my signature.

JULIUS H. RICHARDS.